United States Patent
Ishikawa et al.

(10) Patent No.: US 9,310,492 B2
(45) Date of Patent: Apr. 12, 2016

(54) RADIOGRAPHIC IMAGE READING DEVICE, COMPUTER READABLE MEDIUM, AND RADIOGRAPHIC IMAGE READING METHOD

(71) Applicant: FUJIFILM CORPORATION, Tokyo (JP)

(72) Inventors: Hiromi Ishikawa, Ashigarakami-gun (JP); Yasunori Ohta, Ashigarakami-gun (JP); Tomoki Inoue, Ashigarakami-gun (JP); Nobuhiko Ogura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/340,834

(22) Filed: Jul. 25, 2014

(65) Prior Publication Data

US 2015/0090910 A1 Apr. 2, 2015

(30) Foreign Application Priority Data

Sep. 30, 2013 (JP) .................................. 2013-205196

(51) Int. Cl.
G01T 1/105 (2006.01)
G01T 1/20 (2006.01)

(52) U.S. Cl.
CPC .................................... G01T 1/2014 (2013.01)

(58) Field of Classification Search
CPC ........ G03B 42/08; G03B 42/02; G06T 5/007; A61B 6/4216; G01T 1/2014; G01T 1/2016; G01T 1/2012; G01T 1/2928; H04N 2201/0412; H04N 1/00013; G03G 15/758
USPC ....................................................... 250/585
See application file for complete search history.

(56) References Cited

U.S. PATENT DOCUMENTS 5,109,297 A * 4/1992 Izumi ................... H04N 1/0281
                                                         250/235
5,434,431 A * 7/1995 Verbeke ................ G01T 1/2014
                                                         250/585

(Continued)

FOREIGN PATENT DOCUMENTS

GB         2 431 536 A    4/2007
JP      2001-313815 A    11/2001

(Continued)

OTHER PUBLICATIONS

Extended European Search Report, issued Feb. 27, 2015, for European Application No. 14177079.2.

(Continued)

*Primary Examiner* — David J Makiya
*Assistant Examiner* — Taeho Jo
(74) *Attorney, Agent, or Firm* — Birch, Stewart, Kolasch & Birch, LLP

(57) ABSTRACT

A radiographic image reading device includes a reading unit configured to photoelectrically read photostimulated luminescence light produced from a storage phosphor sheet illuminated with excitation light, the storage phosphor sheet, at which a radiographic image is stored, being scanned by a scanning unit using the excitation light; and a control unit configured to control the reading unit so as to cause the reading unit, in a case of reading at a first resolution, to read with excitation light at a first scanning speed and a first intensity and, in a case of reading at a second resolution that is a higher resolution than the first resolution, to read with excitation light at a second scanning speed that is slower than the first scanning speed and a second intensity that is smaller than the first intensity.

12 Claims, 10 Drawing Sheets

(56) References Cited

U.S. PATENT DOCUMENTS

| | | | | |
|---|---|---|---|---|
| 6,314,198 B1* | 11/2001 | Ogura | ............... | G06T 5/007 382/132 |
| 6,343,142 B1* | 1/2002 | Tsutamori | ............... | G01N 30/95 250/583 |
| 6,365,909 B1* | 4/2002 | Hayakawa | ............ | G03B 42/02 250/584 |
| 6,437,359 B1* | 8/2002 | Hall | ............ | G03B 42/02 206/455 |
| 6,580,525 B1* | 6/2003 | Iwakiri | ............ | H04N 1/0402 250/472.1 |
| 7,148,501 B1* | 12/2006 | Kralles | ............ | G03B 42/08 250/584 |
| 2002/0104975 A1* | 8/2002 | Livingston | ............ | G01T 1/2014 250/585 |
| 2003/0063708 A1* | 4/2003 | Shoji | ............ | A61B 6/4291 378/154 |
| 2005/0008262 A1* | 1/2005 | Komiya | ............ | H04N 1/2361 382/305 |
| 2008/0042081 A1* | 2/2008 | Urbon | ............ | G03B 42/08 250/584 |
| 2008/0265187 A1* | 10/2008 | Boutet | ............ | G03B 42/08 250/585 |
| 2009/0039288 A1* | 2/2009 | Kulpinski | ............ | G01T 1/2012 250/484.4 |
| 2009/0039298 A1* | 2/2009 | Kulpinski | ............ | G01T 1/2014 250/585 |
| 2010/0246922 A1 | 9/2010 | Uchihara et al. | | |
| 2012/0170083 A1* | 7/2012 | Joh | ............ | H04N 1/00013 358/475 |

FOREIGN PATENT DOCUMENTS

| | | |
|---|---|---|
| JP | 2004-163792 A | 6/2004 |
| JP | 2010-239480 A | 10/2010 |

OTHER PUBLICATIONS

Japanese Office Action issued Aug. 25, 2015 in corresponding Japanese Patent Application No. 2013-205196.

* cited by examiner

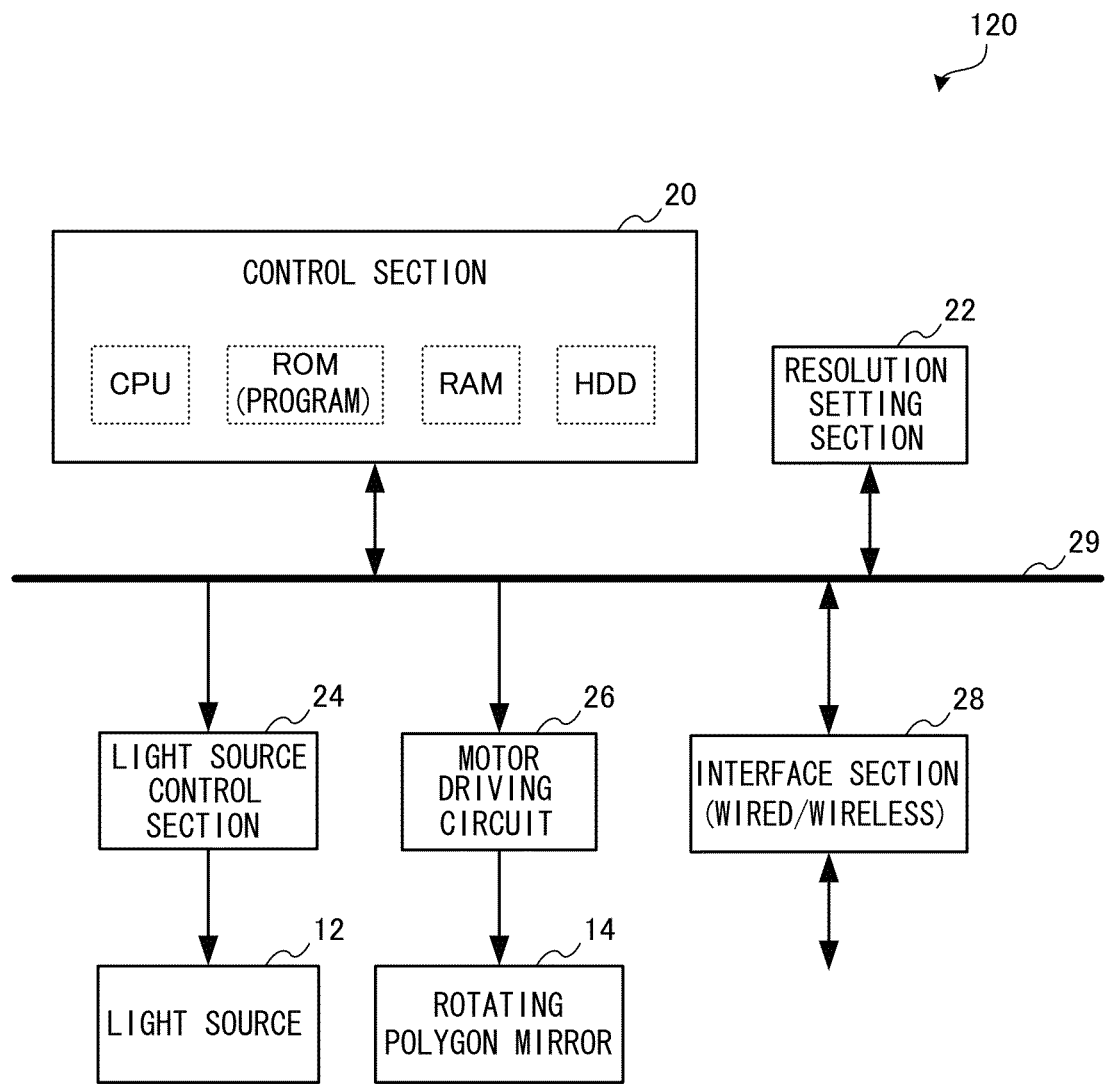

HIGH-RESOLUTION MODE

| EXCITATION LIGHT INTENSITY (mW) | SCANNING IRREGULARITIES (QL VALUE) |
|---|---|
| 20 | 24 |
| 15 | 14 |
| 10 | 12 |
| 5 | 4 |
| 2 | 0 |

LOW-RESOLUTION MODE

| EXCITATION LIGHT INTENSITY (mW) | SCANNING IRREGULARITIES (QL VALUE) |
|---|---|
| 20 | 6 |
| 2 | 0 |

| EXCITATION LIGHT INTENSITY (mW) | SIGNAL-TO-NOISE RATIO |
|---|---|
| 2 | 103 |
| 4 | 131 |
| 6 | 142 |
| 8 | 150 |
| 10 | 156 |
| 20 | 163 |

FIG.9

| IMAGE PLATE TYPE | PIXEL SIZE (μm/PIXEL) | ROTATING POLYGON MIRROR ROTATION SPEED (RPM) | SAMPLING RATE (μs/PIXEL) | EXCITATION LIGHT INTENSITY (mW) |
|---|---|---|---|---|
| HIGH-RESOLUTION MODE | UR-1 | 25 | 812 | 0.7 | 2 |
| LOW-RESOLUTION MODE | ST-VI | 100 | 2273 | 1 | 20 |

RADIOGRAPHIC IMAGE READING DEVICE, COMPUTER READABLE MEDIUM, AND RADIOGRAPHIC IMAGE READING METHOD

CROSS-REFERENCE TO RELATED APPLICATIONS

This application claims priority under 35 USC 119 from Japanese Patent Application No. 2013-205196 filed on Sep. 30, 2013, the disclosure of which is incorporated by reference herein.

BACKGROUND OF THE INVENTION

1. Field of the Invention

The present invention relates to a radiographic image reading device, a computer readable medium storing a radiographic image reading program, and a radiographic image reading method.

2. Description of the Related Art

When radiation (X-rays, α rays, β rays, γ rays, ultraviolet rays, an electron beam or the like) is irradiated onto a storage phosphor (a photostimulable phosphor), a portion of the radiation energy is stored in the storage phosphor. Subsequently, when an excitation light such as a laser light or the like is illuminated onto the storage phosphor, the storage phosphor is photostimulated and luminesces in accordance with the stored energy.

In general, radiographic image reading devices that employ storage phosphors are used for clinical applications, non-destructive testing in industry and the like. In a radiographic image reading device, image information of a radiographic image of an imaging subject, such as a weld or the like, is temporarily recorded in a sheet (an image plate IP, which is a storage phosphor sheet) that includes a storage phosphor layer. The storage phosphor sheet IP is scanned with excitation light, and photostimulated luminescence light that is produced is read photoelectrically.

For example, Japanese Patent Application Laid-Open (JP-A) No. 2004-163792 describes a radiographic image reading device that employs standard-resolution storage phosphor sheets and high-resolution storage phosphor sheets. When an image is being read at high resolution, a polygon mirror for illuminating the excitation light onto the surface of the storage phosphor sheet is rotated at a low speed, and when an image is being read at low resolution, the polygon mirror is rotated at a high speed.

Meanwhile, there are calls for the elimination of irregularities (scanning irregularities) that arise in radiographic images. JP-A No. 2010-239480 describes a technology that eliminates stripe irregularities (linear irregularities) in a radiographic image. This technology eliminates the linear irregularities by image correction from an original image that contains the linear irregularities, which has been read by a radiographic image reading device.

With the technology recited in JP-A No. 2010-239480, because irregularities are eliminated in the image data by the image correction, there is a risk that portions of a scanning target may be mistakenly removed. For example, in a case in which a portion of the scanning target is a fault in a weld or the like, due to the fault being linear, the fault may be treated as an irregularity and corrected.

SUMMARY OF THE INVENTION

The present invention has been made in view of the above circumstances and provides a radiographic image reading device, a computer readable medium storing a radiographic image reading program, and a radiographic image reading method.

According to an aspect of the invention, there is provided a radiographic image reading device which includes a reading unit configured to photoelectrically read photostimulated luminescence light produced from a storage phosphor sheet illuminated with excitation light, the storage phosphor sheet, at which a radiographic image is stored, being scanned by a scanning unit using the excitation light; and a control unit configured to control the reading unit so as to cause the reading unit, in a case of reading at a first resolution, to read with excitation light at a first scanning speed and a first intensity and, in a case of reading at a second resolution that is a higher resolution than the first resolution, to read with excitation light at a second scanning speed that is slower than the first scanning speed and a second intensity that is smaller than the first intensity.

BRIEF DESCRIPTION OF THE DRAWINGS

Preferred embodiments of the present invention will be described in detail based on the following figures, wherein:

FIG. 4 is a schematic diagram of an example of principal structures for suppressing the production of scanning irregularities in the radiographic image reading device in accordance with the present invention.

FIG. 9 is a table showing conditions in the high-resolution mode and conditions in the low-resolution mode in the radiographic image reading device in accordance with the present exemplary embodiment.

DETAILED DESCRIPTION OF THE INVENTION

Herebelow, an example of a present exemplary embodiment is described with reference to the attached drawings.

Figure 1:
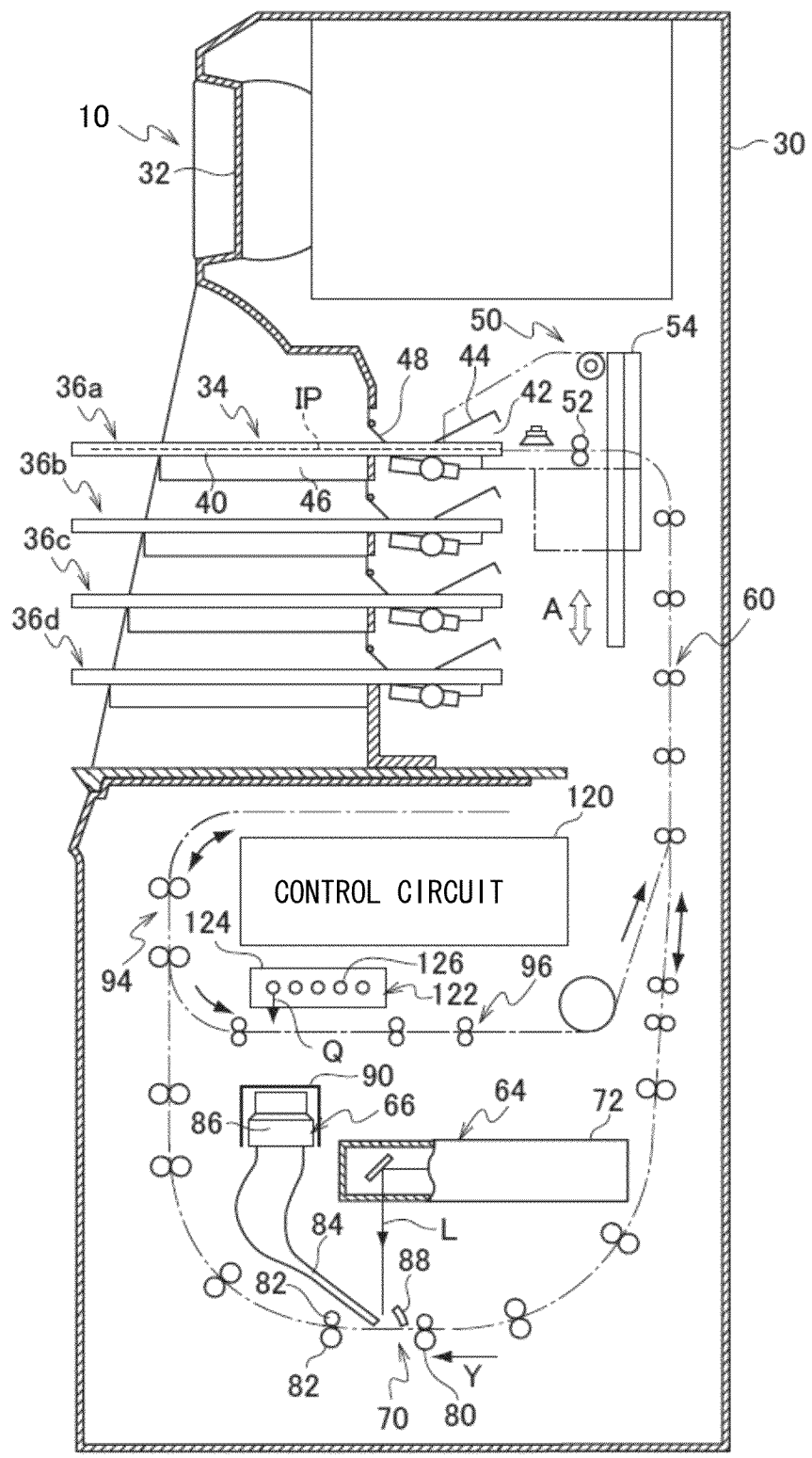
FIG. 1 is a vertical sectional diagram showing the schematic structure of a radiographic image reading device 10, in accordance with a present exemplary embodiment, that reads image information of a radiographic image recorded at a storage phosphor sheet IP.

First, schematic structure of the radiographic image reading device according to the present exemplary embodiment is described. FIG. 1 is a vertical sectional diagram showing the schematic structure of a radiographic image reading device 10 that reads image information of a radiographic image recorded at a storage phosphor sheet IP (hereinafter referred to as "radiographic image information"). The radiographic image reading device 10 according to the present exemplary embodiment may be, for example, a radiographic image reading device that reads radiographic image information recorded at storage phosphor sheets IP in a computed radiography (CR) system for industrial applications, or the like.

As shown in FIG. 1, a touch panel 32 is provided at an upper portion of a casing 30 that structures the exterior of the radiographic image reading device 10. The touch panel 32 has the functions of an operation portion and a monitor. A plural number, for example, four, of cassette loading portions 36a to 36d, at which cassettes 34 can be mounted and removed, are provided below the touch panel 32.

Each cassette 34 includes a rectangular case 40, which accommodates a storage phosphor sheet IP, and a cover body 44, which is capable of opening and closing an opening portion 42 of the case 40.

Support stands 46, on which the cassettes 34 are placed, are provided in the cassette loading portions 36a to 36d. Shutter members 48 are also provided in the cassette loading portions 36a to 36d, to be capable of opening and closing. Each shutter member 48 is for shielding the interior of the casing 30 from light. Cassette position fixing mechanisms (not shown in the drawings) and cover body opening-and-closing mechanisms (not shown in the drawings) are incorporated in the cassette loading portions 36a to 36d. Each cassette position fixing mechanism fixes the position of the cassette 34, and each cover body opening-and-closing mechanism opens and closes the cover body 44 of the cassette 34.

An ascending-and-descending sheet-feeding unit 50 is installed at the interior of the cassette loading portions 36a to 36d. The ascending-and-descending sheet-feeding unit 50 is disposed in arbitrary correspondence with one of the cassette loading portions 36a to 36d. The ascending-and-descending sheet-feeding unit 50 has functions for extracting the storage phosphor sheet IP from the arbitrary cassette 34 and returning the storage phosphor sheet IP into the cassette 34 after the storage phosphor sheet IP has been read and erased. The ascending-and-descending sheet-feeding unit 50 is provided with a sheet body sheet-feeding mechanism 52 and a raising-and-lowering mechanism 54. The sheet body sheet-feeding mechanism 52 includes rollers for conveying the storage phosphor sheets IP one sheet at a time, and the raising-and-lowering mechanism 54 is capable of raising and lowering the sheet body sheet-feeding mechanism 52 in an up-and-down direction (the direction of arrow A).

A main conveyance path 60 for conveying each storage phosphor sheet IP is linked to the sheet body sheet-feeding mechanism 52 of the ascending-and-descending sheet-feeding unit 50. The main conveyance path 60 extends downward from the ascending-and-descending sheet-feeding unit 50, then curves at a lower portion of the casing 30, and reaches a reading conveyance path 70 that extends in the horizontal direction. A first roller pair 80 and a second roller pair 82 that structure the reading conveyance path 70 nip the storage phosphor sheet IP and convey the storage phosphor sheet IP in the direction of arrow Y for sub-scanning. The first roller pair 80 and second roller pair 82 used in the present exemplary embodiment are rollers whose external periphery faces are fabricated of rubber.

The reading conveyance path 70 curves and extends upward, and connects with a withdrawal conveyance path 94 that extends in the horizontal direction. One end of an erasure conveyance path 96 connects between the reading conveyance path 70 and the withdrawal conveyance path 94. The other end of the erasure conveyance path 96 connects with the main conveyance path 60, and the erasure conveyance path 96 supplies a storage phosphor sheet IP conveyed from the withdrawal conveyance path 94 to the main conveyance path 60.

An excitation light scanning unit 64 and an upper reading unit 66 are disposed at an upper portion of an inner periphery side of the reading conveyance path 70 that curves upward.

Figure 2A:
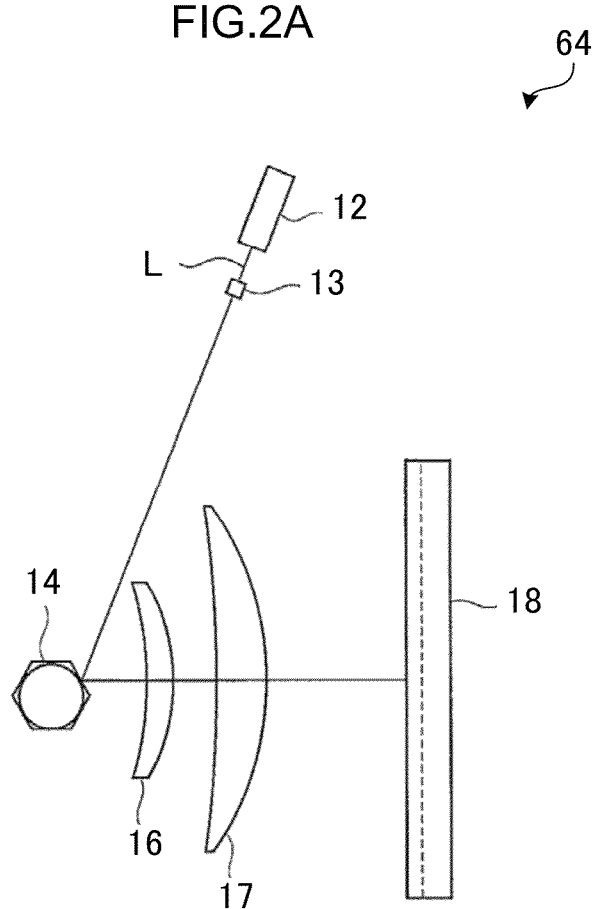
FIG. 2A is a plan diagram showing an example of the structure of an excitation light scanning unit in accordance with the present exemplary embodiment.
Figure 2B:
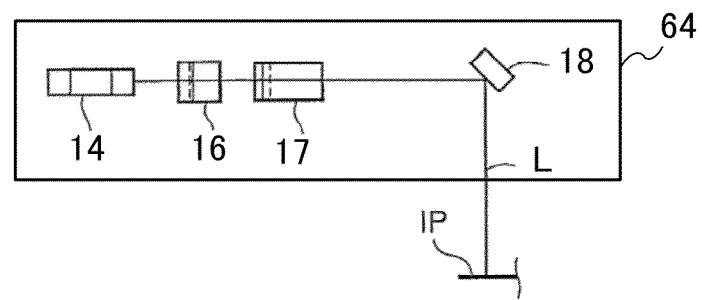
FIG. 2B is a side view showing the example of the structure of the excitation light scanning unit in accordance with the present exemplary embodiment.

FIG. 2A and FIG. 2B are structural diagrams showing an example of the structure of the excitation light scanning unit 64. FIG. 2A shows a plan view of the excitation light scanning unit 64 and FIG. 2B shows a side view of the excitation light scanning unit 64.

As shown in FIG. 2A and FIG. 2B, the excitation light scanning unit 64 is provided with a light source 12, and a diverging lens system 13 for converting excitation light L, which is a laser beam emitted from the light source 12, to divergent light. The excitation light L is made divergent by the diverging lens system 13. The light source 12 may be, for example, a laser diode or the like.

The excitation light scanning unit 64 is provided with a rotating polygon mirror 14, a first lens 16, a second lens 17, and a reflecting mirror 18. The rotating polygon mirror 14 is for reflectively deflecting the excitation light L diverged by the diverging lens system 13 toward a surface (a scanning face) of the storage phosphor sheet IP. The first lens 16 and second lens 17 are disposed subsequent to the rotating polygon mirror 14 and are included in a scanning focusing optical system that focuses the excitation light L on the storage phosphor sheet IP. The reflecting mirror 18 is for reflecting the excitation light L toward the storage phosphor sheet IP.

According to the excitation light scanning unit 64, the excitation light L emitted from the light source 12 is temporarily made divergent by the diverging lens system 13, and then reflected by deflecting faces provided at outer periphery faces of the rotating polygon mirror 14.

The excitation light L reflected by the deflecting faces of the rotating polygon mirror 14 passes through the first lens 16 and second lens 17, is reflected by the reflecting mirror 18 and focused on the storage phosphor sheet IP, and exposes the storage phosphor sheet IP by scanning in a main scanning direction. Meanwhile, the storage phosphor sheet IP is being driven in the sub-scanning direction, which is orthogonal to the main scanning direction in which the excitation light L is scanning, by a driving unit (see FIG. 1). Thus, the surface of the storage phosphor sheet IP is scanned with the excitation light L. Photostimulated luminescence light, containing the radiographic image information, is outputted from the storage phosphor sheet IP on which the excitation light L is illuminated.

The upper reading unit 66 is provided with a condensing guide 84 and a photoelectric converter 86. The condensing guide 84 includes a transparent member such as an acrylic plate or the like, of which an incidence face at a lower end portion thereof is disposed in a vicinity between the first roller pair 80 and the second roller pair 82. The photoelectric converter 86 includes a photomultiplier or the like that is connected to an emission face at an upper end portion of the condensing guide 84.

A condensing mirror 88 is disposed close to the incidence face of the condensing guide 84. The condensing mirror 88 is for efficiently directing the photostimulated luminescence light into the incidence face. The photoelectric converter 86 converts the photostimulated luminescence light that has been guided through the condensing guide 84 to electronic signals.

In the present exemplary embodiment, as shown in FIG. 1, portions of the photoelectric converter 86 other than a light incidence portion (a photoelectric surface) are covered with a magnetic shield member 90. As an example, a member with high magnetic permeability is employed as the magnetic shield member 90. Specifically, permalloy, an oriented electrical steel plate, an iron plate (pure iron) or the like may be used, or an alternative material may be used. Here, permalloy is most excellently employed as the magnetic shield member 90.

A control circuit 120 and an erasure unit 122 are disposed between the withdrawal conveyance path 94 and the erasure conveyance path 96. The control circuit 120 controls the radiographic image reading device 10 as a whole. The erasure unit 122 eliminates radiation energy remaining in a storage phosphor sheet IP from which the radiographic image information has been read. The erasure unit 122 accommodates a plural number of erasure light sources 126 in a case 124. Each erasure light source 126 is formed of a cold-cathode fluorescent tube or the like.

Now, a flow of reading operations by the radiographic image reading device 10 to read a radiographic image from a storage phosphor sheet IP is described.

In the present exemplary embodiment, the conveyance direction in the radiographic image reading device 10 is the sub-scanning direction (the direction of arrow L1 in FIG. 3A), corresponding to the longest direction of a storage phosphor sheet IP (i.e., of a radiographic image recorded at the storage phosphor sheet IP), and the direction orthogonal to the longest direction of the storage phosphor sheet IP (the direction of arrow W1 in FIG. 3A) is the main scanning direction. Each storage phosphor sheet IP is accommodated in the cassette 34 facing to the lower side, and the cassette 34 is loaded in the cassette loading portions 36a to 36d (see FIG. 1).

The cassette 34 loaded in the cassette loading portions 36a to 36d is fixed in position by the mechanism that fixes the position of the cassette 34, after which the cover body 44 of the cassette 34 is opened and the storage phosphor sheet IP is sheet-fed from the cassette 34 by the ascending-and-descending sheet-feeding unit 50. The sheet-fed storage phosphor sheet IP is conveyed by the main conveyance path 60 and is provided to the reading conveyance path 70.

In the reading conveyance path 70, the storage phosphor sheet IP is nipped by the first and second roller pairs 80 and 82 and is conveyed for sub-scanning in the direction of arrow Y.

Meanwhile, the excitation light scanning unit 64 disposed above the reading conveyance path 70 deflects the excitation light L emitted from the light source 12 in the main scanning direction with the rotating polygon mirror 14, thus scanning a storage phosphor layer (not shown in the drawings) of the storage phosphor sheet IP. The storage phosphor layer of the storage phosphor sheet IP illuminated with the excitation light L outputs photostimulated luminescence light containing radiographic image information.

The photostimulated luminescence light outputted from the storage phosphor layer of the storage phosphor sheet IP is incident on the incidence surface of the condensing guide 84 provided at the upper reading unit 66 directly, and is reflected by the condensing mirror 88 and made incident on the incidence surface. Hence, the light is directed through the emission surface of the condensing guide 84 to the photoelectric converter 86 and is converted to electronic signals.

The electronic signals relating to the radiographic image information that are obtained by the photoelectric converter 86 are transferred to the control circuit 120 or, via a wired or wireless communications circuit or the like, to external equipment or the like.

The storage phosphor sheet IP for which reading has been completed is temporarily conveyed from the reading conveyance path 70 to the withdrawal conveyance path 94, and then provided to the erasure conveyance path 96. While a storage phosphor sheet IP for which reading has been completed is being temporarily conveyed to the withdrawal conveyance path 94, another storage phosphor sheet IP may be provided to the reading conveyance path 70. Thus, reading processes may be carried out concurrently.

An erasure light Q from the erasure light sources 126 provided in the erasure unit 122 is illuminated at the storage phosphor layer of the storage phosphor sheet IP provided to the erasure conveyance path 96. Thus, radiographic image information remaining in the storage phosphor layer is erased. The erased storage phosphor sheet IP is conveyed via the main conveyance path 60 to the raising-and-lowering mechanism 54, and is then returned to the predetermined cassette 34.

Figure 3A:
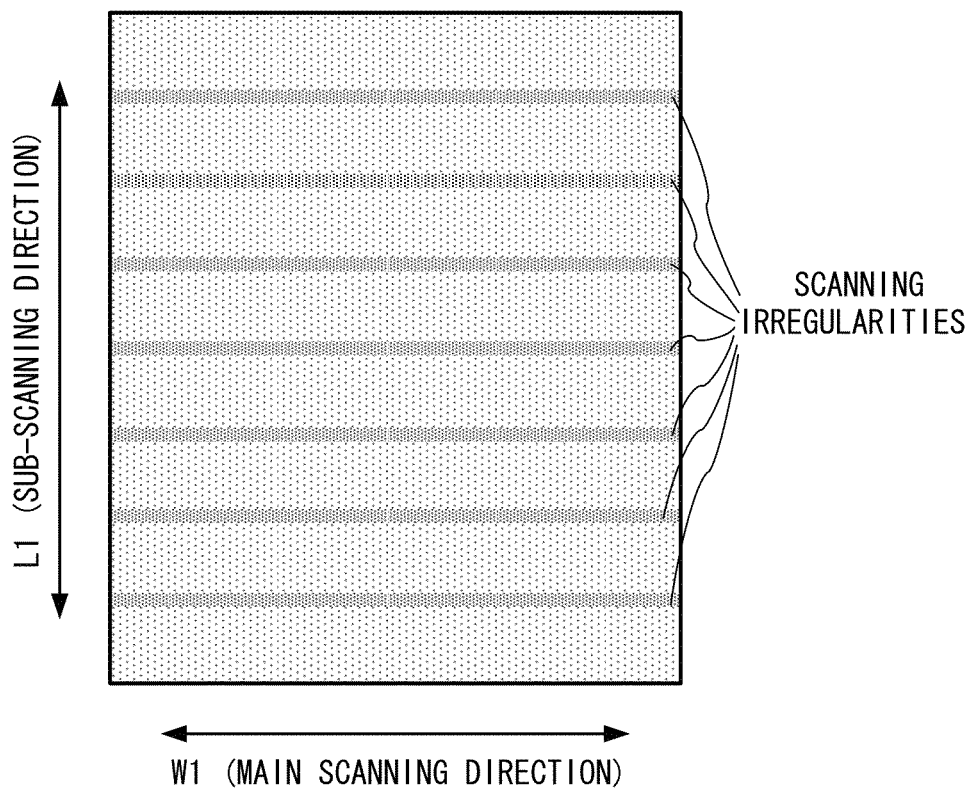
FIG. 3A is a descriptive view for describing scanning irregularities, which is a conceptual view illustrating scanning irregularities that are produced in a read radiographic image.
Figure 3B:
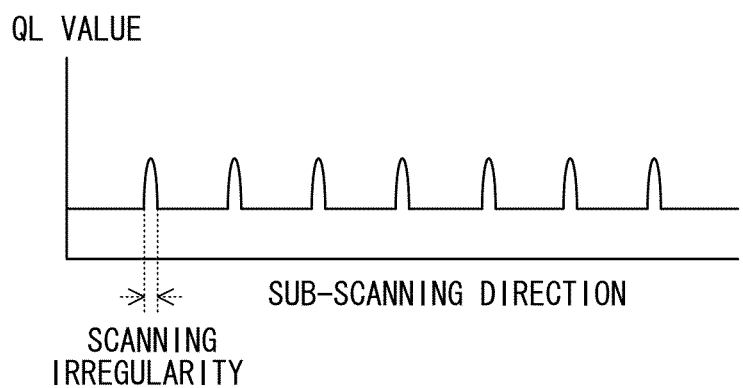
FIG. 3B is a descriptive view for describing the scanning irregularities, which is a descriptive view showing image densities (QL values) in a sub-scanning direction of the radiographic image of FIG. 3A in which the scanning irregularities are produced.

There may be cases in which irregularities caused by density variations (scanning irregularities) arise in the radiographic image according to the radiographic image information recorded in the storage phosphor sheet IP. FIG. 3A and FIG. 3B show descriptive diagrams for describing scanning irregularities. FIG. 3A is a conceptual view illustrating scanning irregularities that are produced in a read radiographic image. FIG. 3B is a descriptive view showing image densities (QL values) in the sub-scanning direction of the radiographic image of FIG. 3A in which scanning irregularities are produced. As shown in FIG. 3A and FIG. 3B, the scanning irregularities are produced along the main scanning direction of the radiographic image, and image densities (QL values) are higher at the scanning irregularities.

Causes for the occurrence of scanning irregularities include: variations in the rotation speeds of motors (not shown in the drawings) that are used for sub-scanning conveyance of the storage phosphor sheets IP; eccentricity of the roller pairs 80 and 82 and the like that are used for conveying the storage phosphor sheets IP; load variations when a storage phosphor sheet IP is fed to the roller pairs 80 and 82; load variations when a storage phosphor sheet IP leaves the roller pairs 80 and 82; and the like.

There are strict requirements relating to scanning irregularities occurring in radiographic images because—for example, in industrial CR—images are enlarged and reduced on a monitor, contrasts are maximized, and so forth. On the other hand, in a case in which scanning irregularities are removed from image data by image correction, there is a risk that portions of a scanning target may be mistakenly removed. For example, in a case in which a portion of the scanning target is a welding defect or the like, in accordance with the defect having a linear shape, the defect may be corrected as a scanning irregularity. Thus, the defect may be removed from the radiographic image that is ultimately obtained.

Accordingly, in the radiographic image reading device 10 according to the present exemplary embodiment, the production of scanning irregularities is suppressed while the radiographic image information is being read. Specifically, in the radiographic image reading device 10, the production of scanning irregularities is suppressed by the control circuit 120 controlling driving of the excitation light scanning unit 64 and controlling the power of the excitation light. FIG. 4 is a schematic diagram of an example of principal structures for suppressing the production of scanning irregularities in the radiographic image reading device 10 in accordance with the present invention.

As shown in FIG. 4, the control circuit 120 is provided with a control section 20, a resolution setting section 22, a light source control section 24, a motor driving circuit 26 and an interface section 28. The control section 20, resolution setting section 22, light source control section 24, motor driving circuit 26 and interface section 28 are connected by a bus 29 to enable exchanges of various kinds of information.

The control section 20 is structured by a microcomputer and is provided with a central processing unit (CPU), a read-only memory (ROM), a random access memory (RAM) and a hard disk drive (HDD). In the control section 20 according to the present exemplary embodiment, the CPU executes reading control processing, which is described in detail below, by executing a program memorized in the ROM. Note that the control section 20 is not limited to the structure shown in FIG. 4 and may be realized by, for example, an application-specific integrated circuit (ASIC), a programmable logic device or the like.

The resolution setting section 22 specifies a resolution for reading a radiographic image. In the radiographic image reading device 10 according to the present exemplary embodiment, two modes are provided as resolutions for reading the radiographic image—a high-resolution mode and a low-resolution mode. The high-resolution mode has a higher resolution than the low-resolution mode, specifically, a pixel size of 25 µm/pixel. The low-resolution mode has a lower resolution than the high-resolution mode, specifically, a pixel size of 100 µm/pixel. Thus, the pixel size is larger in the low-resolution mode than in the high-resolution mode. The meaning of the term "pixel size" includes a value, for both the main scanning direction and the sub-scanning direction, for which a scanning width of the storage phosphor sheet IP is divided by a number of pixels. In the radiographic image reading device 10 according to the present exemplary embodiment, a reading speed is slower in the high-resolution mode than in the low-resolution mode.

In a case in which a user designates a resolution via the touch panel 32 provided at the upper portion of the radiographic image reading device 10, or the interface section 28 or the like, the designated resolution (the high-resolution mode or the low-resolution mode) is specified at the resolution setting section 22.

The light source control section 24 has a function for controlling the light source 12 of the excitation light scanning unit 64. In the present exemplary embodiment, the light source control section 24 is controlled by the control section 20, and thus the intensity (laser power) of the excitation light from the light source 12 is controlled. A method of control of the intensity of the excitation light is not particularly limited; for example, in a case in which the light source 12 is a laser diode, the current value of a driving current may be controlled.

The motor driving circuit 26 has a function for driving (rotating) the rotating polygon mirror 14 of the excitation light scanning unit 64. In the present exemplary embodiment, the motor driving circuit 26 is controlled by the control section 20, and thus the rotation speed of the rotating polygon mirror 14 is controlled. In the radiographic image reading device 10 according to the present exemplary embodiment, the scanning speed at which the surface of the storage phosphor sheet IP is scanned in the sub-scanning direction is controlled, and the reading speed (sampling rate) of the radiographic image is controlled. Specifically, the control section 20 controls the rotation speed of the rotating polygon mirror 14. In the present exemplary embodiment, the rotation speed of the rotating polygon mirror 14 is denoted as a rotation frequency (RPM). The greater the rotation frequency, the faster the rotation speed and the faster the scanning speed. On the other hand, the lower the rotation frequency, the slower the rotation speed and the slower the scanning speed. The interface section 28 is an interface that exchanges information with external equipment.

Figures 5A, 5B, 5C:
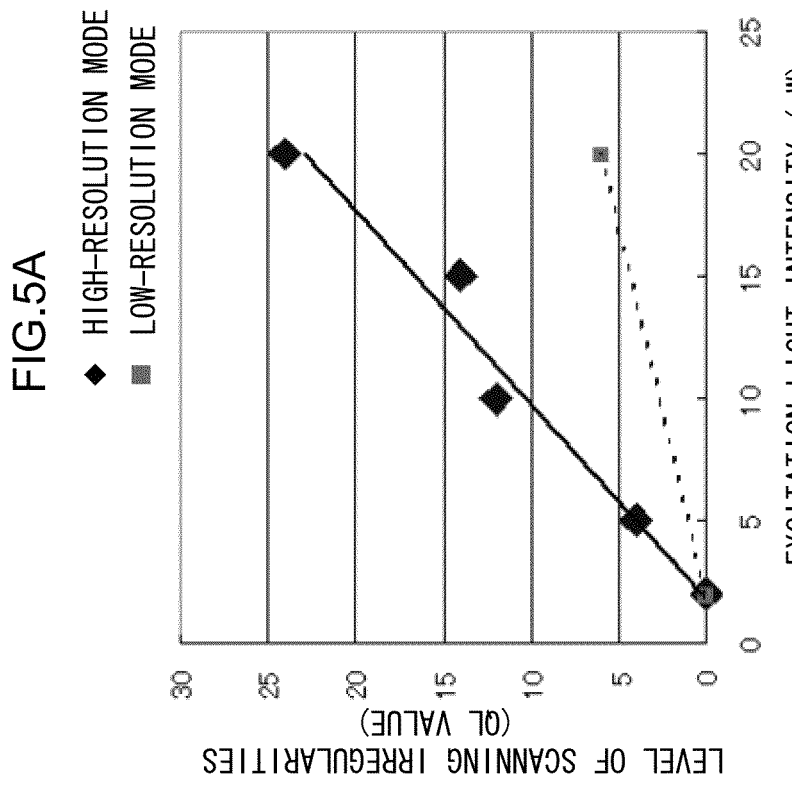
FIG. 5A is a graph showing an example of correspondences between intensities of excitation light and scanning irregularity intensities (QL values) in a high-resolution mode and a low-resolution mode.
FIG. 5B is a table showing an example of the correspondence between the intensity of excitation light and scanning irregularities in the high-resolution mode.
FIG. 5C is a table showing an example of the correspondence between the intensity of excitation light and scanning irregularities in the low-resolution mode.

The production of scanning irregularities in the high-resolution mode and the production of scanning irregularities in the low-resolution mode are now described. FIG. 5A to FIG. 5C show examples of correspondences between the intensity of excitation light and scanning irregularity intensities (QL values) in the high-resolution mode and the low-resolution mode. FIG. 5A is a graph showing an example of correspondences between intensities of excitation light and scanning irregularity intensities (QL values) in a high-resolution mode and a low-resolution mode. FIG. 5B is a table showing an example of the correspondence between the intensity of excitation light and scanning irregularities in the high-resolution mode, and FIG. 5C is a table showing an example of the correspondence between the intensity of excitation light and scanning irregularities in the low-resolution mode.

In the storage phosphor sheet IP used in the present exemplary embodiment, the photostimulable phosphor that is used is $BaFX:Eu^2$ (X=Br, I). As a specific example in a case of the high-resolution mode, Fujifilm Imaging Plate Industrial UR-1, fabricated by Fujifilm Corporation, is used. As a specific example in a case of the low-resolution mode, Fujifilm Imaging Plate Industrial ST-VI, fabricated by Fujifilm Corporation, is used.

Reading conditions in the high-resolution mode are: pixel size, 25 µm/pixel; scanning speed (reading speed), 0.7 µs/pixel; excitation light wavelength, 660 nm; and half-amplitude beam diameter of the excitation light, 30 µm. Reading conditions in the low-resolution mode are: pixel size, 100 µm/pixel; scanning speed (reading speed), 1.0 µs/pixel; excitation light wavelength, 660 nm; and half-amplitude beam diameter of the excitation light, 30 µm. Thus, in the radiographic image reading device 10 according to the present exemplary embodiment, the wavelength and beam diameter of the excitation light are the same irrespective of the high-resolution mode or the low-resolution mode. In the present exemplary embodiment, "the beam diameter" that is referred to is the beam diameter defined by the half-amplitude of the excitation light at the surface of the storage phosphor sheet IP.

As shown in FIG. 5A to FIG. 5C, the stronger the intensity of the excitation light in either the high-resolution mode or the low-resolution mode, the greater the intensities (QL values) of the scanning irregularities, and the smaller the intensity of the excitation light, the smaller the intensities (QL values) of the scanning irregularities. Correspondences between excitation light intensities and scanning irregularity intensities are considered to be particular properties of the storage phosphor sheets IP. In a case in which the excitation light intensities are the same, the intensities (QL values) of the scanning irregularities are smaller in the low-resolution mode than in the high-resolution mode.

As shown in FIG. 5A to FIG. 5C, given excitation light intensities that are the same, there is a tendency for the scanning irregularities to be more visible in a case in which the excitation light beam diameter is larger than the pixel size than in a case in which the excitation light beam diameter is smaller than the pixel size. Taking this factor as an example, the following can be said about scanning irregularities.

Figure 6A:
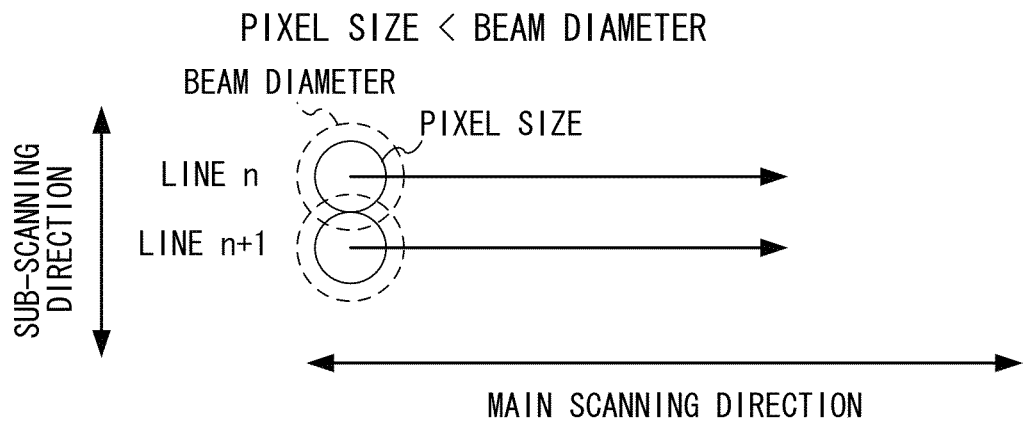
FIG. 6A is a descriptive diagram for describing a correspondence between a beam diameter of excitation light and a pixel size at the surface of a storage phosphor sheet IP, showing a case in which the excitation light beam diameter is larger than the pixel size.
Figure 6B:
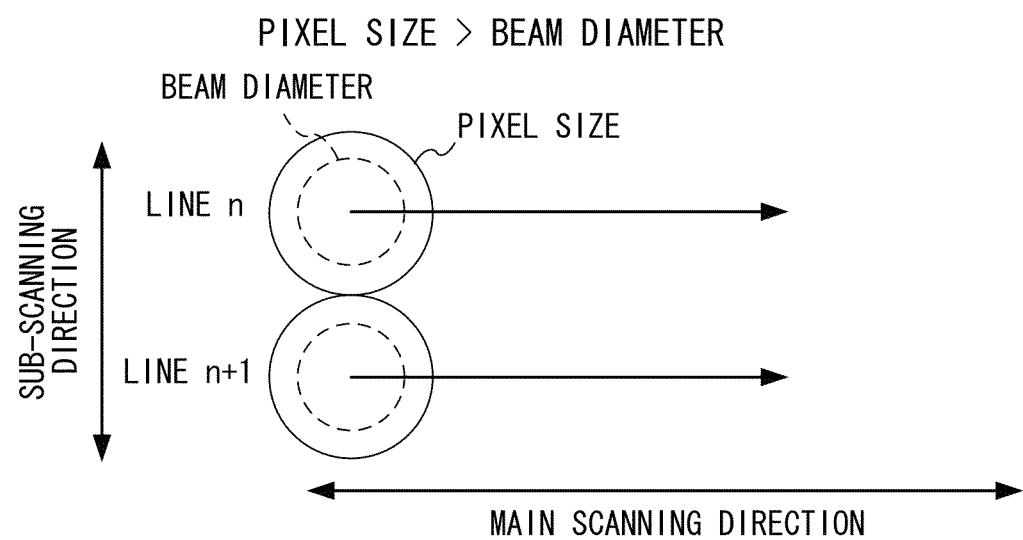
FIG. 6B is a descriptive diagram for describing the correspondence between the beam diameter of excitation light and the pixel size at the surface of the storage phosphor sheet IP, showing a case in which the excitation light beam diameter is smaller than the pixel size.

In the radiographic image reading device 10 according to the present exemplary embodiment, the excitation light illuminated from the excitation light scanning unit 64 is scanned in accordance with the pixels to be read. FIG. 6A and FIG. 6B are descriptive diagrams for describing a correspondence between the excitation light beam diameter and the pixel size at the surface of the storage phosphor sheet IP. FIG. 6A shows a case in which the excitation light beam diameter is larger than the pixel size, and FIG. 6B shows a case in which the excitation light beam diameter is smaller than the pixel size.

As shown in FIG. 6A, in the case in which the excitation light beam diameter is larger than the pixel size, the excitation light illuminated when line (pixel row) n is being read and the excitation light illuminated when line (pixel row) n+1 is being read overlap on the surface of the storage phosphor sheet IP, and a scanning irregularity is likely to arise. In contrast, as shown in FIG. 6B, in the case in which the excitation light beam diameter is smaller than the pixel size, the excitation light illuminated when line (pixel row) n is being read and the excitation light illuminated when line (pixel row) n+1 is being read do not overlap on the surface of the storage phosphor sheet IP.

In the case in which the excitation light beam diameter is larger than the pixel size, as shown in FIG. 6A, the excitation light is illuminated twice at the overlap portion on the storage phosphor sheet IP, as a result of which a scanning irregularity is more likely to be visible than in the case in which the excitation light beam diameter is smaller than the pixel size.

In general, if the intensity (QL value) of a scanning irregularity is less than 10, even if the scanning irregularity is produced in the radiographic image, the scanning irregularity is hard to see. Thus, if the intensity of the excitation light is calculated from the graph shown in FIG. 5A for cases in which the intensity (QL value) of scanning irregularities is 10, which has little effect on the interpretation of the subject image, 9.7 mW is obtained for the high-resolution mode and 32 mW is obtained for the low-resolution mode. Thus, the excitation light intensity in the high-resolution mode is about 30% of the excitation light intensity in the low-resolution mode.

Therefore, in a case in which the scanning irregularity intensity (QL value) is, for example, 10 or less or the like as described above and scanning irregularities are no problem in the low-resolution mode, the production of scanning irregularities in the high-resolution mode may be suppressed if the excitation light intensity in the high-resolution mode is 30% or less of the excitation light intensity in the low-resolution mode.

In the radiographic image reading device 10 according to the present exemplary embodiment, the production of scanning irregularities may be suppressed by the control section 20 controlling excitation light intensities in the high-resolution mode and the low-resolution mode in this manner. According to FIG. 5A to FIG. 5C, it is preferable with regard to scanning irregularities if the excitation light intensity is 2.0 W or less.

Figures 7A, 7B:
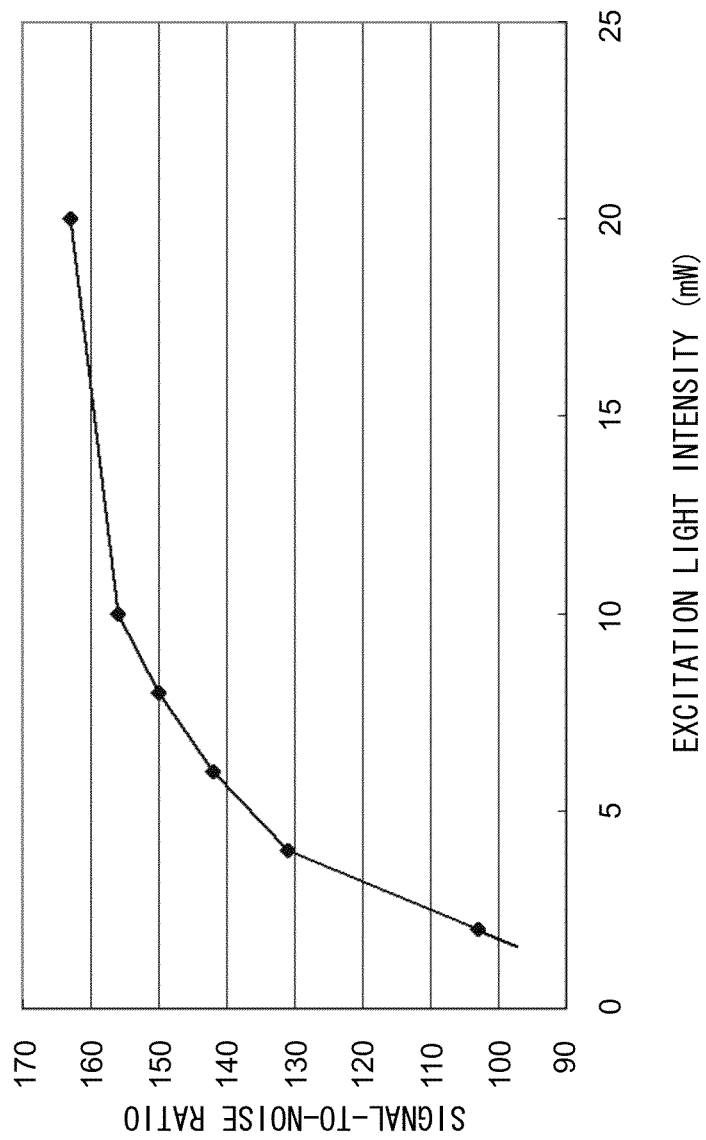
FIG. 7A is a graph showing an example of a correspondence between the intensity of excitation light and the signal-to-noise ratio of a radiographic image in the high-resolution mode, showing an example of a correspondence with the excitation light intensity.
FIG. 7B is a table showing the example of the correspondence between the intensity of excitation light and the signal-to-noise ratio of a radiographic image in the high-resolution mode, showing the example of the correspondence between the excitation light intensity and the signal-to-noise ratio.

On the other hand, the higher the excitation light intensity, the higher the signal-to-noise ratio and the higher the image quality of the radiographic image. FIG. 7A and FIG. 7B show an example of a correspondence between the intensity of excitation light and the signal-to-noise ratio in the high-resolution mode. FIG. 7A is a graph showing an example of the correspondence with the excitation light intensity, and FIG. 7B is a table showing the example of the correspondence between the excitation light intensity and the signal-to-noise ratio. In FIG. 7A and FIG. 7B, the conditions of the high-resolution mode are the same as those mentioned above.

For an image quality complying with ISO 17636-2 (for welding), it is preferable if the signal-to-noise ratio of a radiographic image used for checking defects in a weld is 80 or more. When manufacturing variations and the like are considered, it is more preferable for the signal-to-noise ratio of the radiographic image to be 100 or more.

It can be seen from FIG. 7A and FIG. 7B that for the signal-to noise ratio of a radiographic image to be 100 or more, it is required for the excitation light intensity to be 2.0 mW or more. In the low-resolution mode too, if the excitation light intensity is 2.0 mW or more, the signal-to-noise ratio of the radiographic image is 100 or more, the same as in the high-resolution mode.

In addition to the signal-to-noise ratio increasing as a result of the excitation light intensity being increased, as described above (see FIG. 5A), the effect of an increase in the intensities of scanning irregularities also increases. Therefore, from FIG. 7A and FIG. 7B, it is preferable if an upper limit of the excitation light intensity is 9.7 mW or less.

In the high-resolution mode it is preferable that the excitation light beam diameter is smaller, in order to improve resolvability. However, to reduce the beam diameter, it is necessary to increase the number of lenses included in the scanning focusing optical system of the excitation light scanning unit 64 and make other alterations, which leads to an increase in costs. Accordingly, in the radiographic image reading device 10 according to the present exemplary embodiment, to keep costs down, the excitation light beam diameter is larger than the pixel size in the high-resolution mode. Thus, by the beam diameter size being set in accordance with resolvability in the high-resolution mode, both a high resolution and low costs may be achieved.

Figure 8:
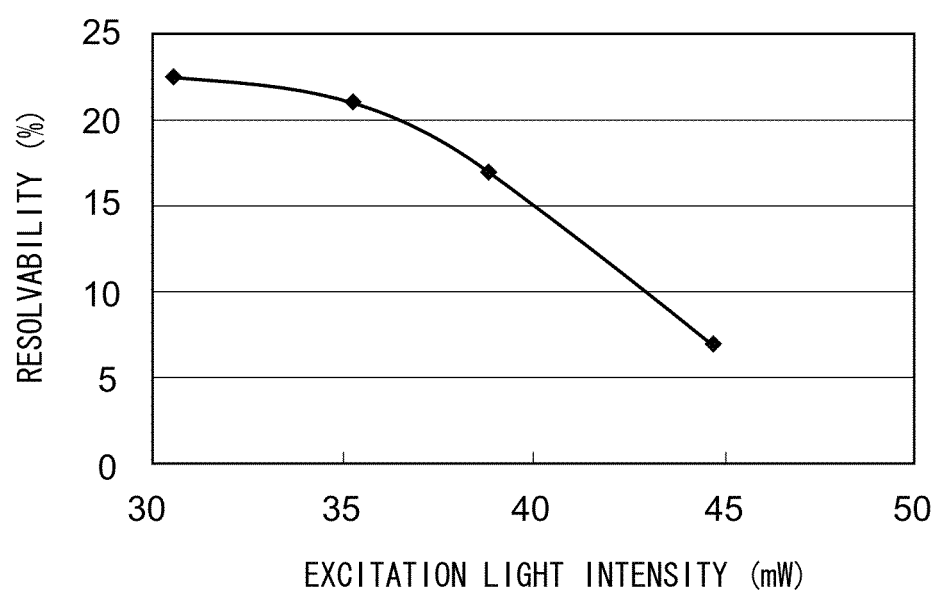
FIG. 8 is a graph showing an example of a correspondence between the excitation light beam diameter and resolvability in the high-resolution mode.

FIG. 8 shows an example of a correspondence between the excitation light beam diameter and resolvability in the high-resolution mode. In FIG. 8, of the conditions in the high-resolution mode, the excitation light intensity is set to 2.0 mW, the beam diameter is set arbitrarily, and other conditions are the same as mentioned above.

In general, it is required that resolvability for industrial CR is obtained by measuring the ability to resolve two wires defined by EN462-5, referred to as a duplex wire. In a case of checking welded portions, a resolvability at DD13 (a condition in which 50 μm wires are spaced by 50 μm) is required to be 20% or more. According to FIG. 8, in the high-resolution mode with a pixel size of 25 µm, a resolvability at the required 20% or above may be obtained if the beam diameter is 36 µm or less. Given this, in the radiographic image reading device 10 according to the present exemplary embodiment, the beam diameter is set to 30 µm regardless of the resolution (mode) and the pixel size in the high-resolution mode is set to 25 µm.

According to the above descriptions, the radiographic image reading device 10 according to the present exemplary embodiment suppresses the production of scanning irregularities by the control section 20 performing reading control processing to make the excitation light intensity smaller in the high-resolution mode than in the low-resolution mode. FIG. 9 shows conditions in the high-resolution mode and conditions in the low-resolution mode in the radiographic image reading device 10 in accordance with the present exemplary embodiment. In the present exemplary embodiment of the radiographic image reading device 10, these conditions are memorized in advance in the HDD of the control section 20 and the resolution setting section 22, or the like.

Figure 10:
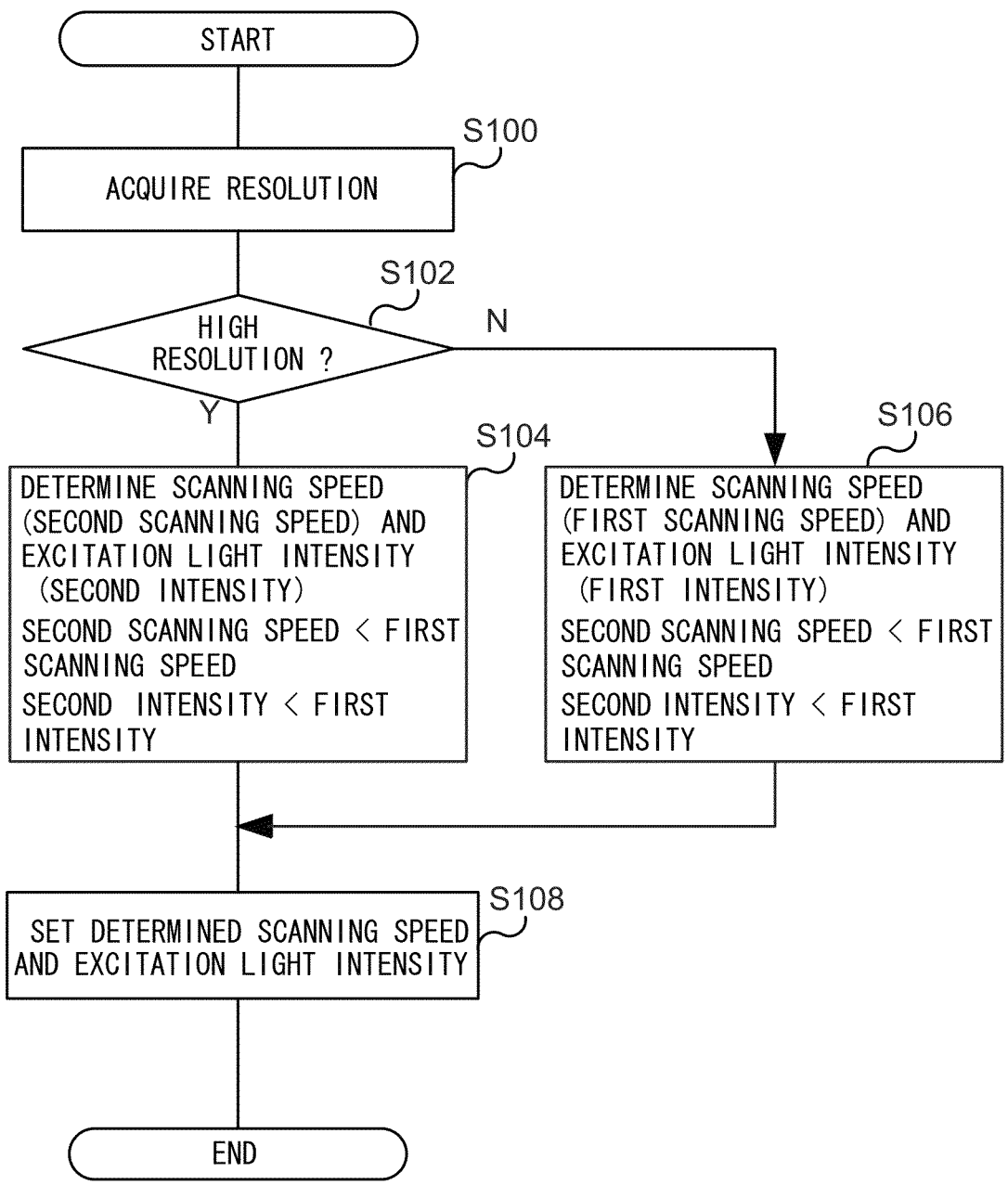
FIG. 10 is a flowchart showing the flow of an example of reading control processing that is executed by a control section of the radiographic image reading device in accordance with the present exemplary embodiment.

FIG. 10 is a flowchart showing the flow of an example of the reading control processing that is executed by the control section 20 of the radiographic image reading device 10 in accordance with the present exemplary embodiment. The reading control processing illustrated in FIG. 10 is executed when radiographic image information is to be read from a storage phosphor sheet IP, in a case in which reading of the radiographic image information has been instructed or the like. The reading control processing illustrated in FIG. 10 is executed by the CPU of the control section 20 executing the program memorized in the ROM.

In step S100, the control section 20 acquires the resolution. In a case in which the resolution is specified at the resolution setting section 22, either the high-resolution mode or the low-resolution mode is acquired therefrom. In a case in which the resolution is designated via the interface section 28 or the like, the resolution (the high-resolution mode or the low-resolution mode) is acquired on the basis of this designation.

Then, in step S102, the control section 20 makes a determination as to whether or not the mode is the high-resolution mode. In a case of the low-resolution mode, the control section 20 advances from step S102 to step S106. In step S106, the control section 20 determines the scanning speed (a first scanning speed) and the excitation light intensity (a first intensity) of the low-resolution mode. As illustrated in FIG. 9, the control section 20 according to the present exemplary embodiment determines a scanning speed of 1.0 µs/pixel and an excitation light intensity of 20 mW in the low-resolution mode.

On the other hand, in a case of the high-resolution mode, the control section 20 advances from step S102 to step S104. In step S104, the control section 20 determines the scanning speed (a second scanning speed) and the excitation light intensity (a second intensity) of the high-resolution mode. As illustrated in FIG. 9, the control section 20 according to the present exemplary embodiment determines a scanning speed of 0.7 µs/pixel and an excitation light intensity of 2.0 mW in the high-resolution mode. In other words, in a case of the high-resolution mode, a slower scanning speed is determined than in the low-resolution mode (second scanning speed<first scanning speed), and in the case of the high-resolution mode, a smaller excitation light intensity is determined than in the low-resolution mode (second intensity<first intensity).

After step S104 and step S106, in step S108, the control section 20 sets the determined scanning speed and excitation light intensity, after which the present reading control processing ends. The control section 20 instructs the motor driving circuit 26 the determined scanning speed, and the motor driving circuit 26 drives (rotates) the rotating polygon mirror 14 in accordance with this instruction. The control section 20 instructs the light source control section 24 the determined excitation light intensity, and the light source control section 24 controls light emissions from the light source 12 in accordance with this instruction.

As described hereabove, in the radiographic image reading device 10 according to the present exemplary embodiment, a high-resolution mode (with a pixel size of 25 µm/pixel) and a low-resolution mode (with a pixel size of 100 µm/pixel) are provided as modes for reading radiographic image information from storage phosphor sheets IP. The control section 20 makes the intensity of the excitation light smaller in the high-resolution mode than in a case of reading radiographic image information in the low-resolution mode. The control section 20 also makes the scanning speed slower in the high-resolution mode than in the case of reading radiographic image information in the low-resolution mode. As a specific example, in the high-resolution mode, the rotation speed of the rotating polygon mirror 14 is 812 RPM, the scanning speed (reading speed) is 0.7 µs/pixel, and the intensity of the excitation light is 2.0 mW. Meanwhile, in the low-resolution mode, the rotation speed of the rotating polygon mirror 14 is 2,273 RPM, the scanning speed (reading speed) is 1.0 µs/pixel, and the intensity of the excitation light is 20 mW.

Thus, in the radiographic image reading device 10 according to the present exemplary embodiment, the intensity of the excitation light is switched between the high-resolution mode and the low-resolution mode, and because the high-resolution mode has a smaller excitation light intensity than the low-resolution mode, scanning irregularities produced in the radiographic images may be suppressed.

Thus, according to the radiographic image reading device 10 of the present exemplary embodiment, scanning irregularities in a radiographic image may be suppressed without the scanning irregularities being removed from the image data by image correction. According to the radiographic image reading device 10 of the present exemplary embodiment, because scanning irregularities need not be removed from the image data by image correction, there is no risk of portions of a scanning target being mistakenly removed by image correction.

In the radiographic image reading device 10 according to the present exemplary embodiment, because the excitation light intensity in the high-resolution mode is set to 30% or less of the excitation light intensity in the low-resolution mode, the production of scanning irregularities can be appropriately suppressed in the low-resolution mode too.

In the radiographic image reading device 10 according to the present exemplary embodiment, because the excitation light intensity in the high-resolution mode is set to 2.0 mW, both the production of scanning irregularities may be appropriately suppressed and a high signal-to-noise ratio may be obtained.

In the radiographic image reading device 10 according to the present exemplary embodiment, the pixel size is less than the excitation light beam diameter in the high-resolution mode, and the pixel size is greater than the excitation light beam diameter in the low-resolution mode. Further, the pixel size is 25 µm and the beam diameter is 30 µm in the high-resolution mode. Accordingly, both a high resolution in the high-resolution mode and low costs may be achieved.

In the exemplary embodiment described above, a case is described in which the reading control processing program is memorized in advance in the control section 20 of the radiographic image reading device 10. However, the program may be obtained and memorized from a recording medium such as a floppy disk, a Digital Versatile Disc (DVD), a magneto-optical disc, a Universal Serial Bus (USB) memory or the like, or from external equipment or the like. In the present exemplary embodiment, the reading control processing is implemented by software processing, but the reading control processing may also be implemented by hardware resources.

The radiation of the present invention is not particularly limited by the present exemplary embodiment; X-rays, gamma rays and so forth may be employed.

Structures, operations and the like of the radiographic image reading device 10, the excitation light scanning unit 64, the upper reading unit 66, the control circuit 120 and the like described in the present exemplary embodiment are examples and it will it clear that these may be modified in accordance with conditions within a scope not departing from the spirit of the present invention.

According to an aspect of the invention, there is provided a radiographic image reading device which includes: a reading unit configured to photoelectrically read photostimulated luminescence light produced from a storage phosphor sheet illuminated with excitation light, the storage phosphor sheet, at which a radiographic image is stored, being scanned by a scanning unit using the excitation light; and a control unit configured to control the reading unit so as to cause the reading unit, in a case of reading at a first resolution, to read with excitation light at a first scanning speed and a first intensity and, in a case of reading at a second resolution that is a higher resolution than the first resolution, to read with excitation light at a second scanning speed that is slower than the first scanning speed and a second intensity that is smaller than the first intensity.

In the radiographic image reading device according to the aspect of the present invention, a beam diameter of the excitation light at a surface of the storage phosphor sheet may be the same regardless of the resolution, a pixel size of the first resolution may be larger than the beam diameter of the excitation light, and a pixel size of the second resolution may be smaller than the beam diameter of the excitation light.

In the radiographic image reading device according to the aspect of the present invention, it is preferable that a second intensity may be 2.0 mW or more at a surface of the storage phosphor sheet.

In the radiographic image reading device according to the aspect of the present invention, it is preferable that a second intensity at a surface of the storage phosphor sheet may be 30% or less of the first intensity at the surface of the storage phosphor sheet.

In the radiographic image reading device according to the aspect of the present invention, it is preferable that a beam diameter of the excitation light may be 30 μm, a preferable pixel size of the first resolution may be 100 μm, and a pixel size of the second resolution may be 25 μm.

According to another aspect of the invention, there is provided a radiographic image reading program that causes a computer to function as the control unit of the radiographic image reading device according to the aspect of the present invention.

According to another aspect of the invention, there is provided a radiographic image reading method which includes, controlling, by a controlling unit, a reading unit, which is configured to photoelectrically read photostimulated luminescence light produced from a storage phosphor sheet illuminated with excitation light, the storage phosphor sheet, at which a radiographic image is stored, being scanned by a scanning unit using the excitation light, so as to cause the reading unit, in a case of reading at a first resolution, to read with excitation light at a first scanning speed and a first intensity and, in a case of reading at a second resolution that is a higher resolution than the first resolution, to read with excitation light at a second scanning speed that is slower than the first scanning speed and a second intensity that is smaller than the first intensity.

According to the present invention, image quality can be raised and scanning irregularities can be reduced.

Embodiments of the present invention are described above, but the present invention is not limited to the embodiments as will be clear to those skilled in the art.

All publications, patent applications, and technical standards mentioned in this specification are herein incorporated by reference to the same extent as if each individual publication, patent application, or technical standard was specifically and individually indicated to be incorporated by reference.

What is claimed is:

1. A radiographic image reading device, comprising:
a reading unit configured to photoelectrically read photostimulated luminescence light produced from a storage phosphor sheet illuminated with excitation light, the storage phosphor sheet, at which a radiographic image is stored, being scanned by a scanning unit using the excitation light; and
a control unit configured to control the reading unit so as to cause the reading unit, in a case of reading at a first resolution, to read with excitation light at a first scanning speed and a first intensity and, in a case of reading at a second resolution that is a higher resolution than the first resolution, to read with excitation light at a second scanning speed that is slower than the first scanning speed and a second intensity that is smaller than the first intensity,
wherein a beam diameter of the excitation light at a surface of the storage phosphor sheet is the same regardless of the resolution, a pixel size of the first resolution is larger than the beam diameter of the excitation light, and a pixel size of the second resolution is smaller than the beam diameter of the excitation light.

2. The radiographic image reading device according to claim 1, wherein the second intensity is 2.0 mW or more at a surface of the storage phosphor sheet.

3. The radiographic image reading device according to claim 1, wherein the second intensity at a surface of the storage phosphor sheet is 30% or less of the first intensity at the surface of the storage phosphor sheet.

4. The radiographic image reading device according to claim 3, wherein a beam diameter of the excitation light is 30 μm, a pixel size of the first resolution is 100 μm, and a pixel size of the second resolution is 25 μm.

5. A non-transitory computer readable medium storing a program causing a computer to execute a process for reading a radiographic image, the process comprising:
controlling, by a control unit, a reading unit configured to photoelectrically read photostimulated luminescence light produced from a storage phosphor sheet illuminated with excitation light, the storage phosphor sheet, at which a radiographic image is stored, being scanned by a scanning unit using the excitation light, so as to cause the reading unit, in a case of reading at a first resolution, to read with excitation light at a first scanning speed and a first intensity and, in a case of reading at a second resolution that is a higher resolution than the first resolution, to read with excitation light at a second scanning speed that is slower than the first scanning speed and a second intensity that is smaller than the first intensity, wherein a beam diameter of the excitation light at a surface of the storage phosphor sheet is the same regardless of the resolution, a pixel size of the first resolution is larger than the beam diameter of the excitation light, and a pixel size of the second resolution is smaller than the beam diameter of the excitation light.

6. The computer readable medium according to claim 5, wherein the second intensity is 2.0 mW or more at a surface of the storage phosphor sheet.

7. The computer readable medium according to claim 5, wherein the second intensity at a surface of the storage phosphor sheet is 30% or less of the first intensity at the surface of the storage phosphor sheet.

8. The computer readable medium according to claim 7, wherein a beam diameter of the excitation light is 30 μm, a pixel size of the first resolution is 100 μm, and a pixel size of the second resolution is 25 μm.

9. A radiographic image reading method, comprising:
controlling, by a control unit, a reading unit configured to photoelectrically read photostimulated luminescence light produced from a storage phosphor sheet illuminated with excitation light, the storage phosphor sheet, at which a radiographic image is stored, being scanned by a scanning unit using the excitation light, so as to cause the reading unit, in a case of reading at a first resolution, to read with excitation light at a first scanning speed and a first intensity and, in a case of reading at a second resolution that is a higher resolution than the first resolution, to read with excitation light at a second scanning speed that is slower than the first scanning speed and a second intensity that is smaller than the first intensity, wherein a beam diameter of the excitation light at a surface of the storage phosphor sheet is the same regardless of the resolution, a pixel size of the first resolution is larger than the beam diameter of the excitation light, and a pixel size of the second resolution is smaller than the beam diameter of the excitation light.

10. The radiographic image reading method according to claim 9, wherein the second intensity is 2.0 mW or more at a surface of the storage phosphor sheet.

11. The radiographic image reading method according to claim 9, wherein the second intensity at a surface of the storage phosphor sheet is 30% or less of the first intensity at the surface of the storage phosphor sheet.

12. The radiographic image reading method according to claim 11, wherein a beam diameter of the excitation light is 30 μm, a pixel size of the first resolution is 100 μm, and a pixel size of the second resolution is 25 μm.

* * * * *